US012586703B2

(12) United States Patent
Martinez Garcia

(10) Patent No.: US 12,586,703 B2
(45) Date of Patent: Mar. 24, 2026

(54) BIOMAGNETIC SEPARATION SYSTEM WITH DOUBLE RING PROFILE

(71) Applicant: SEPMAG SYSTEMS, S.L., Cerdanyola del Vallès (ES)

(72) Inventor: Lluis Miquel Martinez Garcia, Cerdanyola del Vallès (ES)

(73) Assignee: SEPMAG SYSTEMS, S.L., Cerdanyola del Vallès (ES)

( * ) Notice: Subject to any disclaimer, the term of this patent is extended or adjusted under 35 U.S.C. 154(b) by 246 days.

(21) Appl. No.: 18/372,303

(22) Filed: Sep. 25, 2023

(65) Prior Publication Data

US 2024/0112839 A1 Apr. 4, 2024

(30) Foreign Application Priority Data

Sep. 27, 2022 (EP) .................................... 22382891

(51) Int. Cl.
*H01F 7/02* (2006.01)

(52) U.S. Cl.
CPC .................................. *H01F 7/0205* (2013.01)

(58) Field of Classification Search
CPC ............... H01F 7/0205; B03C 2201/18; B03C 2201/22; B03C 2201/26; B03C 1/0332; B03C 1/288
See application file for complete search history.

(56) References Cited

U.S. PATENT DOCUMENTS

| | | | | |
|---|---|---|---|---|
| 3,608,718 | A * | 9/1971 | Aubrey, Jr. | B03C 1/035 209/214 |
| 5,186,827 | A * | 2/1993 | Liberti | A23B 2/60 422/503 |
| 5,347,254 | A * | 9/1994 | Leupold | G01R 33/383 335/306 |
| 2007/0018764 | A1 | 1/2007 | Martinez Garcia | |
| 2018/0028990 | A1 | 2/2018 | Frodsham | |
| 2021/0031211 | A1 | 2/2021 | Høyer | |

FOREIGN PATENT DOCUMENTS

| | | | |
|---|---|---|---|
| JP | 2005152886 | A * | 6/2005 |
| JP | 2020175373 | A * | 10/2020 |

OTHER PUBLICATIONS

K. Halbach, "Design of permanent multipole magnets with oriented rare earth cobalt material", Nuclear Instruments and Methods vol. 169, Issue 1, Feb. 1, 1980, pp. 1-10, 43 pages.
H. A. Leupold, "Static Applications" in "Rare Earth Permanent Magnets", J. M. D. Coey (Editor), 1996, pp. 401-405, (2 pages).
European Search Report for priority European Patent App. No. EP22382891 dated Mar. 14, 2023, 2 pages.

* cited by examiner

*Primary Examiner* — Mohamad A Musleh
(74) *Attorney, Agent, or Firm* — Barnes & Thornburg LLP

(57) ABSTRACT

Biomagnetic separation system comprising an outer ring and an inner ring of permanent magnets, the outer ring being a quadrupole Halbach Cylinder and the inner ring being a Halbach Cylinder with N poles. The diameter of the cylinders and other conditions are chosen so that at the inner radius of the inner ring the magnetic field gradient is greater at the vessel wall than the magnetic field gradient of the outer ring alone.

2 Claims, 4 Drawing Sheets

BIOMAGNETIC SEPARATION SYSTEM WITH DOUBLE RING PROFILE

PRIORITY CLAIM

This application claims priority to European Patent Application No. EP22382891.4, filed Sep. 27, 2022, which is expressly incorporated by reference herein.

BACKGROUND

The present disclosure relates to the field of magnetic separation of particles. More in particular, the present disclosure refers to a biomagnetic separator for large volumes.

SUMMARY

According to the present disclosure, a magnetic separator includes an outer ring comprising a quadrupolar Halbach cylinder and an inner ring made of permanent magnets with a particular number of poles and inner and outer radius that depend on the filling factor of the magnets and the radii of the vessel and the outer ring. The inner ring provides a magnetic field gradient at $Z_0$ which retains the particles and does not compromise the separation capability of the outer ring.

In this way, slipping-down of the separated particles at the inner walls of the vessel is avoided, while maintaining a high productivity of the separation process and reducing the amount of the rare-earth magnets necessary for achieving the sought magnetic field gradient.

In illustrative embodiments, the biomagnetic separation system of the present disclosure has a double ring profile comprising an outer ring with inner radius $R_1$ and outer radius $R_2$ of $n_2>4$ permanent magnets of the same geometry and a magnetization progression of $$\Delta\gamma_2=3\Delta\theta_2$$

where $\Delta\theta_2$ Is the angular distance between two consecutive magnets, and an inner ring with outer radius $R_1$ and inner radius $R_0$ of $n_1$ permanent magnets of the same geometry, with $n_1>2N$, N being the number of pole pairs, the inner ring magnets having a magnetization progression of $$\Delta\gamma(N+1)\Delta\theta$$

where $\Delta\theta$ Is the angular distance between two consecutive segments, where the inner ring is concentric with the outer ring and defines an inner bore for placing a vessel whose inner face is at $Z_0$ from the geometric center of the rings, the outer ring having a remanence $Br_1$ and filing factor $f_1$ the inner ring having a remanence $Br_2$ and filling factor $f_2$ and wherein the outer ring and inner ring fulfill the following conditions:

$$Nz^{N-2} > 2kf\left(1-\frac{R_0}{R_2}\right)$$

$$R_1 > \frac{R_0}{\sqrt[N-1]{1-\frac{2kf\left(1-\frac{R_0}{R_2}\right)}{Nz^{N-2}}}}$$

with k>1, z being the ratio $Z_0/R_0$ and $f=(Br_2*f_2)/(Br_1*f_1)$.

In the particular case that all the magnets used for both rings are the same, and the filling factor is also the same, f=1.

The outer ring can be made however of sub-rings of magnets with different remanence and the filling factor of both rings can be different.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
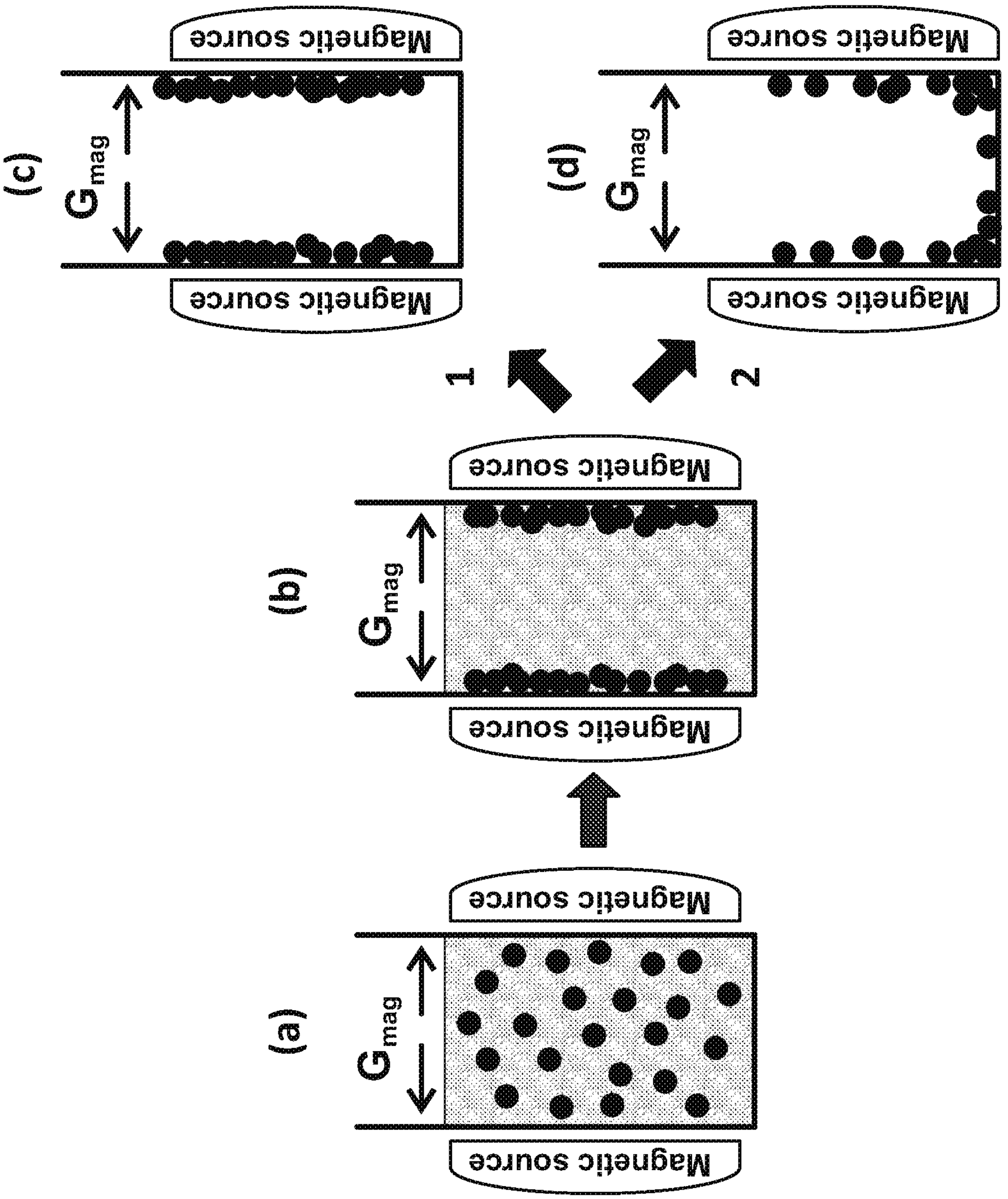
FIG. 1 shows the working principle of a system according to the present disclosure.

With reference to FIG. 1, the working principle of the large-volume magnetic separation of beads/particles is as follows: a vessel containing the suspension is introduced into the separation system (FIG. 1(*a*)). The particles move radially to the walls of the vessel, dragged by the magnetic field gradient (FIG. 1(*b*)). When the supernatant/buffer is extracted from the vessel, the particles are retained on the walls of the receptacle thanks to the application of a second magnetic field gradient as will be explained later (FIG. 1(*c*)).

Figure 2:
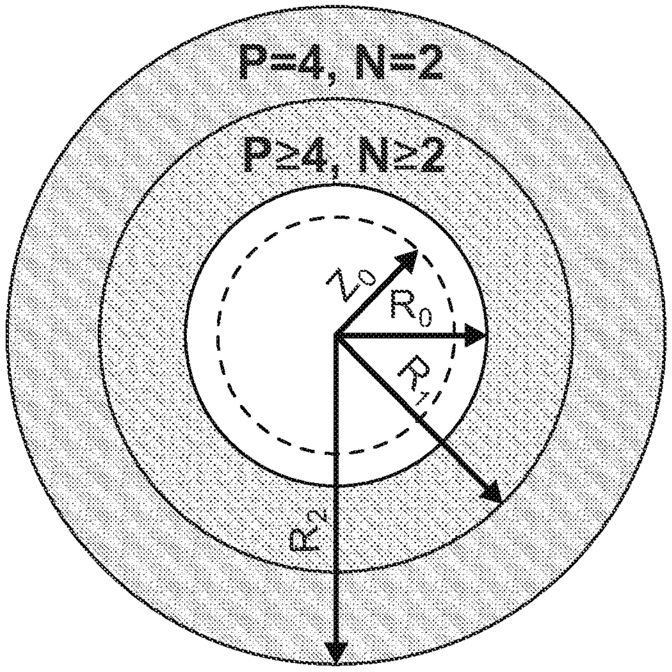
FIG. 2 shows the description of a double magnetic field gradient separation system according to the present disclosure.

If the magnetic field gradient would not be strong enough on the walls of the receptacle, the particles would not be fully retained on the walls as in the present disclosure (FIG. 1(*d*)). In order to solve this problem, the present disclosure as shown in FIG. 2 proposes a double-ring approach. An outer ring made of a plurality of concentric sub-rings and forming a quadrupole Halbach cylinder (the number of pole pairs, N, is 2) generates a magnetic field with a constant gradient high enough to separate the particles. An inner ring generates a higher polar number field (N>2), with a shorter reach but a higher magnetic field gradient at the retention position Z0. The inner ring defines the inner space or bore of the device, in which a vessel containing the suspension is to be placed.

Assuming the height of the ring is larger than its inner radius, for a given radial position Z0, a single quadripolar Halbach cylinder with inner radius R0 (R0>Z0) and external radius R2 (R2>R0) would generate a magnetic field gradient of Br2·f2/R0*(1−R0/R2), where Br2 is the remanence of the permanent magnets used for building the system and f2 the filling factor (f2=1 when the ring is manufactured by magnets filling all the ring, f2<1 if the geometry of the magnets doesn't fill all the space).

For having a magnetic field gradient at Z0 (k>1) k-times higher than that of the quadrupole Halbach cylinder, the present disclosure provides an inner magnetic ring with inner radius R0, and external radius R1 (same as the inner radius of the outer ring), made of permanent magnets with remanence Br1, filling factor f1, and its number of pole pairs N fulfilling the condition:

$$Nz^{N-2} > 2kf\left(1-\frac{R_0}{R_2}\right)$$

where z is the ratio Z0/R0 and f=(Br2*f2)/(Br1f1), f=1 if the filling factor and magnets remanence are both the same for the inner and outer rings (Br1=Br2, f1=f2). The value of the outer radius of the inner ring R1 (R0<R1<R2) should be $$R_1 > \frac{R_0}{\sqrt[N-1]{1-\frac{2kf\left(1-\frac{R_0}{R_2}\right)}{Nz^{N-2}}}}$$

The factor k is the ratio between the magnetic field gradient necessary for safely retaining the magnetic beads when the suspension liquid is removed, and the magnetic field gradient generated by a quadripolar Halbach Cylinder with inner radius R0 and outer radius R2, filled with permanent magnets with remanence Br2 and a filling factor f2 and capable of separating the particles.

All the relations above apply obviously to all cases where the dimensions of the separation device are R0>Z0 and the height of the rings, h, greater that the internal diameter of the inner ring (h>2R0)

The inner ring should then be manufactured with n1 segments of permanent magnets with the same geometry, with n1>2N, each one with an angular progression of the magnetization, Δγ, $$\Delta\gamma=(N+1)\Delta\theta$$

where Δθ2 Is the angular distance between two consecutive segments (Δθ=2π/n2).

The outer ring, with inner radius R1 and outer radius R2, should be built with the number of segments n2>4. The angular progression of the magnetization should be $$\Delta\gamma_2=3\ \Delta\theta_2$$

where Δθ2 Is the angular distance between two consecutive segments (Δθ2=2π/n2).

The resultant double ring device generates a magnetic field gradient larger than the equivalent quadrupolar Halbach cylinder alone at the position Z0, while the gradient in the inner part of the vessel wall will be 2Br2·f2/R1*(1−R1/R2).

Figure 3:
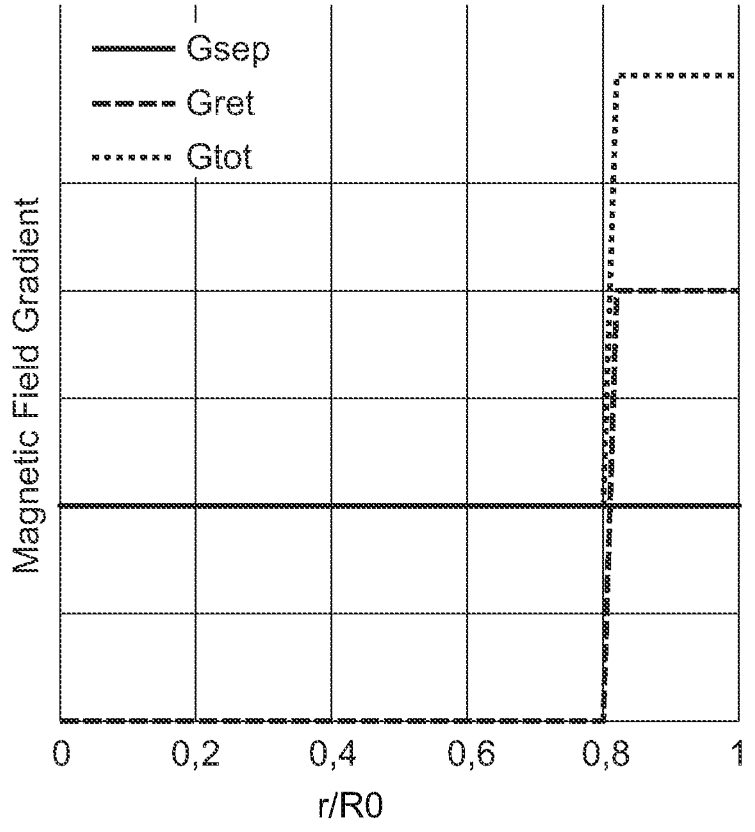
FIG. 3 is a graph showing the magnetic field gradient exerted by both rings versus the normalized radius of the device.

As shown in FIG. 3, the profile of the separation magnetic field gradient Gsep, contrary to that of the retention magnetic field gradient Gret, is constant in the whole volume of the inner space. The retention magnetic field gradient is noticeable only in the vicinity of the interior walls of the device, that is, close to the vessel's walls.

Example

A device was built for separating the magnetic beads from a biological suspension contained in a vessel with a diameter 286.5 mm and a wall thickness of 4.1 mm. When the vessel is filled, the height of the liquid is 400 mm. For ensuring that all magnetic beads are retained in the inner walls of the vessel (Z0=139.2 mm) when all the supernatant is extracted, it is necessary a radial magnetic field gradient of at least 15 T/m. In the present example, the outer ring was made of two sub-rings and the magnet's remanence was the same both for the outer and inner ring.

Figure 4:
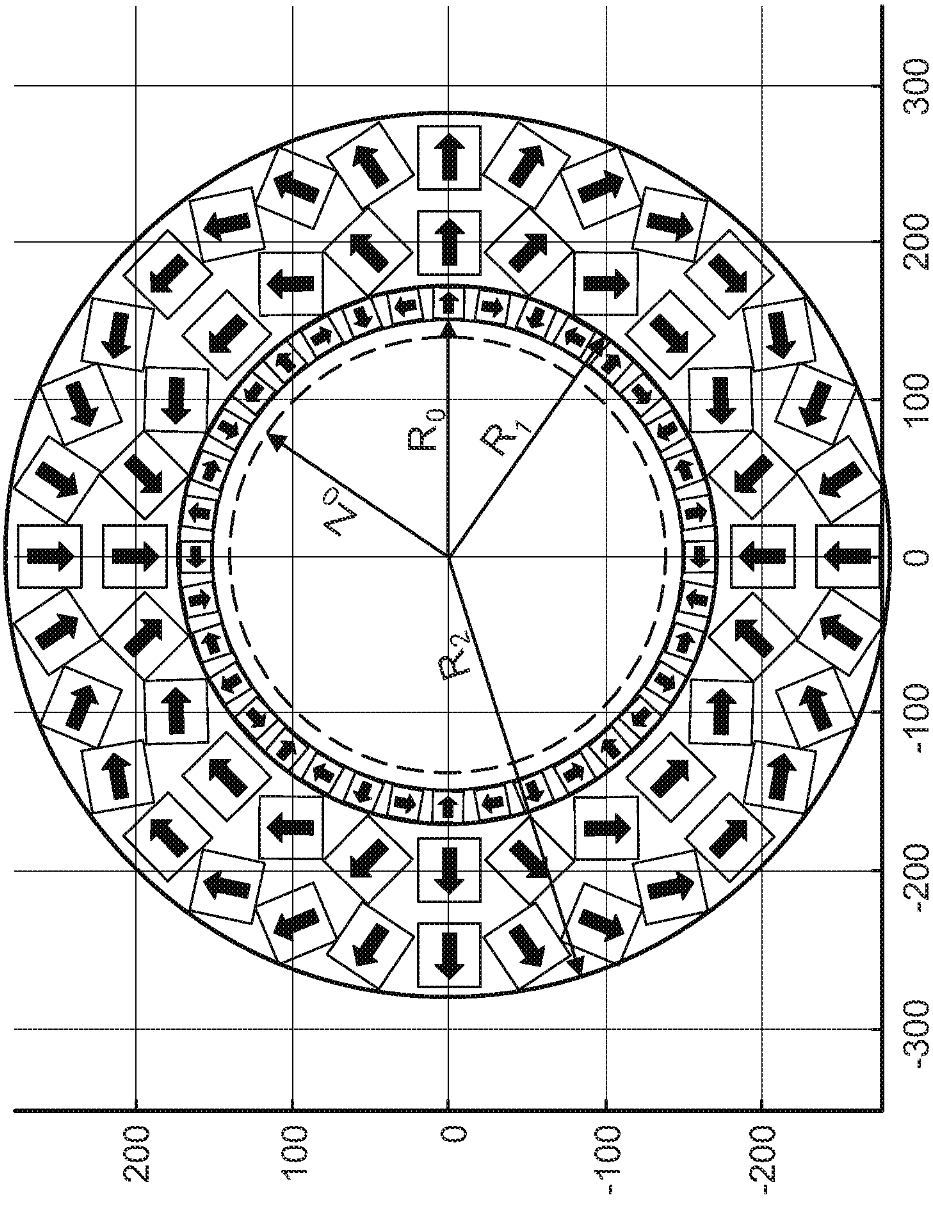
FIG. 4 shows a double magnetic field gradient separation system according to the present disclosure. In this particular embodiment, the magnets used for the Halbach cylinder (outer and inner rings) have a square cross-section.

The device is shown in FIG. 4 and has the following features:

An inner ring with an inner radius of R0=150 mm and outer radius R1=172 mm is manufactured using 36 magnets of 20×20×400 mm, magnetized along the 20 mm direction, Br1=1.32 T, with the center at R=164 mm from the cylindrical axe (the geometrical center of both rings, as they are concentrical) and separated by 10° and with their magnetization direction rotating by 100° between consecutive magnets (number of pole pairs, N=9). The filling factor of this ring is f1=0.65.

An outer ring with an inner radius of R1=172 mm and outer radius R2=282 mm is manufactured with two sub-rings of 40×40×400 mm magnets magnetized along the 40 mm direction, with Br2=1.32 T. The first sub-ring has 24 magnets with the center at R=199 mm from the cylindrical axe and separated by 15°, with their magnetization direction rotating by 45° between consecutive magnets. The second sub-ring is composed of 32 magnets with the center at R=232 mm from the cylindrical axe and separated by 11.25° with their magnetization direction rotating by 33.75° between consecutive magnets. The filling factor of the outer ring is f2=0.57.

The magnets will be enclosed in an Aluminium frame with an inner diameter of 296 mm, an outer diameter of 568 mm, and a height of 400 mm with the corresponding housing for the magnets. The system will be enclosed with a 10 mm thick top and a bottom cover with the same diameters as the Aluminium frame. The resultant device weighs 405 kg. 308 kg corresponds to the permanent magnets and 97 kg to the Aluminium frame and covers.

Figure 5:
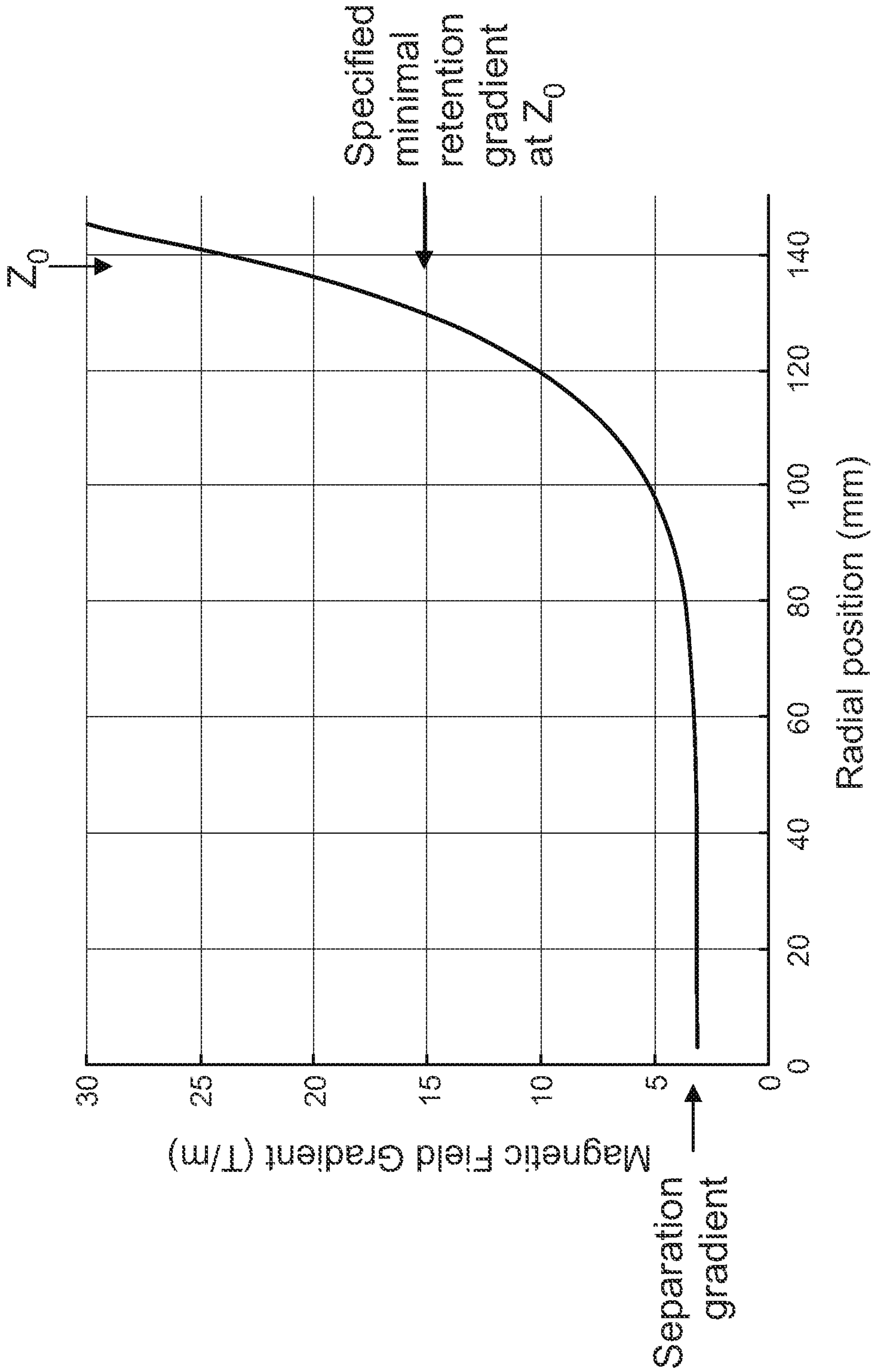
FIG. 5 shows the magnetic field gradient profile along the radius at θ=0° at the embodiment shown FIG. 4.

As shown in FIG. 5, the magnetic field gradient generated by the inner ring at Z0 is 20.2 T/m and the outer ring generates a constant gradient of 3.4 T/m. The retention gradient at Z0 is higher than 15 T/m, fulfilling the magnetic field gradient specifications.

As it is used herein, the term "comprises" and derivations thereof (such as "comprising", etc.) should not be understood in an excluding sense, that is, these terms should not be interpreted as excluding the possibility that what is described and defined may include further elements, steps, etc.

On the other hand, the present disclosure is obviously not limited to the specific embodiment(s) described herein, but also encompasses any variations that may be considered by any person skilled in the art (for example, as regards the choice of materials, dimensions, components, configuration, etc.) to be within the general scope of the present disclosure as defined in the claims.

Magnetic separation systems have many applications in the field of medicine, biology and pharmacology. Particular elements of a sample, suspension or solution (for instance some types of antibodies), often need to be separated in order to analyze aspects regarding these elements (like diagnosing an illness). The methods traditionally used to achieve this type of separation of elements, particles or molecules are the method of separation by affinity columns and the centrifugation method.

Another comparative method is a method of separation based on the use of magnetic particles. This comparative method is quick and easy for precise and reliable separation of elements such as, for example, specific proteins, genetic material and biomolecules (see, for example, Z M Saiyed, et al., "Application of Magnetic Techniques in the Field of Drug Discovery and Biomedicine". BioMagnetic Research and Technology 2003, 1:2, published 18 Sep. 2003 (available at http://www.biomagres.com/content/1/1/2). The comparative method is based on the use of magnetic particles configured to join to the specific elements that are to be separated from a sample, solution, suspension, etc., in some type of vessel. By applying a magnetic field, the magnetic particles are separated from the rest of the sample or, rather, are concentrated at the walls of the vessel, where they are retained (for example, due to the magnetic field which is applied) while the rest of the sample (or, at least, a substantial part of the rest of the sample) is removed. The retained fraction can subsequently be subjected to a washing process which may include another separation of magnetic particles, etc.

Separators of magnetic particles based on the structure disclosed in U.S. Pat. No. 5,705,064 can generate intense magnetic fields, while separators based on the structure disclosed in US-A-2003/0015474 can generate almost constant magnetic field gradients. These structures are based on the Halbach Theorem, which demonstrates that if the magnetization of an infinite linear magnet magnetized perpendicularly to its axis is rotated around this axis, the magnetic field is constant in module throughout the space and its direction turns in all of the space in the same angle in the direction opposite to rotation (K. Halbach, "Design of permanent multipole magnets with oriented rare earth cobalt material", Nuclear Instruments and Methods Volume 169, Issue 1, 1 Feb. 1980, Pages 1-10). Using this principle, dipolar sources can be developed which produce uniform fields inside cylindrical cavities (see, for example, H. A. Leupold, "Static Applications" in "Rare Earth Permanent Magnets", J. M. D. Coey (Editor), 1996, pages 401-405). In addition, a near zero magnetic field can be achieved outside the cylinder, something which is advantageous in terms of safety. These structures are also referred to as "Halbach Cylinders".

The principle can be easily used on multipolar sources, achieving, in the case of four pole sources, a constant gradient. These structures are functional and present, in theory, no major technical problems when small volumes are involved (applied to recipients of volumes in the order of a few ml). The magnetic field gradient generated by the Halbach cylinder of inner radius R0 and external radius R2, will generate a constant magnetic field gradient over the magnetic particles, generating a radial movement to the inner walls of a cylindrical vessel of inner radius Z0 inserted in a bore coaxial with the cylinder (Z0<R0).

Once the magnetic particles are separated (i.e. all of them arrive to their final positions), the suspension liquid is removed. At this point the magnetic field gradient should be strong enough to keep all the magnetic particles retained in the inner walls of the vessel, even when is not liquid, avoiding the loss of magnetic particles and the biomolecules attached to them. For a given volume concentration of particles in the suspension, the surface density of magnetic particles retained in the inner cylindrical wall of the vessel at the end of the separation process will increase linearly with its radius. Then the magnetic field gradient needed to retain the magnetic particles will be higher for larger radius vessels.

However, the magnetic field gradient generated by a quadripolar Halbach cylinder will be ∇B=2*Br/R0*(1−R0/R2), where Br is the remanence of the permanent magnet used. Even in the case of an infinitely high cylinder with R2 infinite (R0/R2−>0), the gradient will be inversely proportional to the radius and with a limit ∇B>2*Br/R0.

When increasing the radius of the vessel Z0 for increasing the batch volume of the magnetic separation process, a suspension of magnetic particles will use an increased magnetic field gradient to cope with the larger surface density of magnetic particles at the retention area, while the magnetic field gradient will decrease, limited by the inner radius of the bore (R0>Z0). At a critical radius, the gradient generated by the quadripolar Halbach cylinder will be smaller than the value needed for retaining the magnetic particles when the suspension liquid is removed.

The present disclosure solves the problems above by providing a magnetic separator with an outer ring comprising a quadrupolar Halbach cylinder and an inner ring made of permanent magnets with a particular number of poles and inner and outer radius that depend on the filling factor of the magnets and the radii of the vessel and the outer ring. The inner ring provides a magnetic field gradient at Z0 which retains the particles and does not compromise the separation capability of the outer ring.

In this way, slipping-down of the separated particles at the inner walls of the vessel is avoided, while maintaining a high productivity of the separation process and reducing the amount of the rare-earth magnets necessary for achieving the sought magnetic field gradient.

More in particular, the biomagnetic separation system of the present disclosure has a double ring profile comprising an outer ring with inner radius R1 and outer radius R2 of n2>4 permanent magnets of the same geometry and a magnetization progression of $$\Delta\gamma_2=3\Delta\theta_2$$

where Δθ2 Is the angular distance between two consecutive magnets, and an inner ring with outer radius R1 and inner radius R0 of n1 permanent magnets of the same geometry, with n1>2N, N being the number of pole pairs, the inner ring magnets having a magnetization progression of $$\Delta\gamma=(N+1)\Delta\theta$$

where Δθ Is the angular distance between two consecutive segments, where the inner ring is concentric with the outer ring and defines an inner bore for placing a vessel whose inner face is at Z0 from the geometric center of the rings, the outer ring having a remanence Br1 and filing factor f1 the inner ring having a remanence Br2 and filling factor f2 and wherein the outer ring and inner ring fulfill the following conditions:

$$Nz^{N-2} > 2kf\left(1-\frac{R_0}{R_2}\right)$$

$$R_1 > \frac{R_0}{\sqrt[N-1]{1-\frac{2kf\left(1-\frac{R_0}{R_2}\right)}{Nz^{N-2}}}}$$

with k>1, z being the ratio Z0/R0 and f=(Br2*f2)/(Br1*f1).

In the particular case that all the magnets used for both rings are the same, and the filling factor is also the same, f=1.

The outer ring can be made however of sub-rings of magnets with different remanence and the filling factor of both rings can be different.

The invention claimed is:

1. A biomagnetic separation system with double ring profile comprising:

an outer ring with inner radius $R_1$ and outer radius $R_2$, the outer ring comprising a number of permanent magnets $n_2$ greater than 4 and of the same geometry forming a quadrupolar Halbach cylinder and a magnetization direction progression $\Delta\gamma_2$ of:

$$\Delta\gamma_2 = 3\Delta\theta_2$$

wherein $\Delta\theta_2 = 2\pi/n_2$ is the angular distance between two consecutive magnets, and an inner ring with outer radius $R_1$ and inner radius $R_0$, the inner ring comprising a number of permanent magnets $n_1$ of the same geometry forming a Halbach cylinder having a number of pole pairs N greater than 2 and $n_1 > 2N$, the inner ring magnets having a magnetization direction progression $\Delta\gamma$ of:

$$\Delta\gamma = (N+1)\Delta\theta$$

wherein $\Delta\theta = 2\pi/n_1$ is the angular distance between two consecutive magnets, where the inner ring is concentric with the outer ring and defines an inner bore; and a cylindrical vessel of an inner radius $Z_0$, the cylindrical vessel inserted into the bore of the inner ring coaxially with the geometric center of the rings, wherein the outer ring having a remanence Br1 and filling factor f1;

the inner ring having a remanence Br2 and filling factor f2; and the inner ring fulfills the following conditions:

$$Nz^{N-2} > 2kf\left(1 - \frac{R_0}{R_2}\right);$$

$$R_1 > \frac{R_0}{\sqrt[N-1]{1 - \frac{2kf\left(1 - \frac{R_0}{R_2}\right)}{Nz^{N-2}}}};$$

wherein $k > 1$, z is the ratio $Z_0/R_0$ and $f = (Br_2 + f_2)/(Br_1 * f_1)$.

2. The biomagnetic separation system of claim 1, wherein f=1, and the filling factor and magnets remanence are the same for the inner and outer rings.

* * * * *